United States Patent [19]
Mori

[11] Patent Number: 5,909,286
[45] Date of Patent: Jun. 1, 1999

[54] IMAGE DATA READING SYSTEM

[75] Inventor: Hiromi Mori, Nagoya, Japan

[73] Assignee: Brother Kogyo Kabushiki Kaisha, Nagoya, Japan

[21] Appl. No.: 08/828,303

[22] Filed: Mar. 28, 1997

[30] Foreign Application Priority Data

May 13, 1996 [JP] Japan ..................................... 8-118099

[51] Int. Cl.⁶ .................................................. H04N 1/32
[52] U.S. Cl. .......................... 358/442; 358/468; 358/437; 358/405
[58] Field of Search .................................. 382/442, 468, 382/437, 405

[56] References Cited

U.S. PATENT DOCUMENTS 5,677,775 10/1997 Yamaguchi et al. .................... 358/437

Primary Examiner—Phuoc Tran
Attorney, Agent, or Firm—Oliff & Berridge, PLC

[57] ABSTRACT

An image data reading system is capable of receiving image data without interruption regardless of the amount of time required to read the data. The system comprises a monitor program, a scanner driver and a viewer program. The viewer program initiates a data read process and the scanner driver orders the monitor program to read image data. Upon elapse of a predetermined time period, for example, 30 seconds, the system determines if the monitor program is still reading image data. If the monitor program is still reading image data, the scanner driver does not perform time-out processing. Instead, the system allows the monitor program to continue to read the image data until a read end message for the current page is received from the monitor program. If the monitor program is not reading image data, the scanner driver notifies the viewer program of a probable error and terminates the data read process.

18 Claims, 4 Drawing Sheets

IMAGE DATA READING SYSTEM

BACKGROUND OF THE INVENTION

1. Field of the Invention

This invention relates to an image data reading system. More particularly, this invention is directed to an image data reading system capable of receiving image data normally when it takes a long time to receive the data transmitted from a scanner to a host machine in the system.

2. Description of the Related Art

Systems comprising a facsimile machine connected to a host personal computer have recently been developed. Typically, the facsimile machine is used as a printer for printing images output by the computer, or as a scanner for inputting desired images into the computer. In such a system, a control program in the personal computer controls the facsimile machine.

FIG. 3 is a block diagram of a conventional image data reading system. A personal computer 1 is connected to a facsimile machine 7 via an RS-232C I/O port 2. The personal computer 1 typically comprises application programs 6, driver programs 5, a hard disk drive 4, a monitor program 3 and the I/O port 2. The application programs 6, operated directly by a user, comprise a viewer program 6A and a log manager program 6B. The viewer program 6A displays data contents onto a display screen (not shown). The log manager program 6B stores and manages the communication history between the personal computer 1 and the facsimile machine 7 connected to the I/O port 2.

The driver programs 5 are interposed between the application programs 6 and the facsimile machine 7, and facilitate data exchange between them. The method used to access the facsimile machine 7 varies depending on the hardware configuration of the facsimile machine 7 and the personal computer 1. It is difficult to change the access method used by the application programs 6 in order to accommodate different system environments. Thus, the driver programs 5 are interposed between the application programs 6 and the facsimile machine 7. Accordingly, the access method used by the driver programs 5 may be changed to accommodate different system environments, while a single access method is used by the application programs 6.

The driver programs 5 between the application programs 6, and the facsimile machine 7 comprise three programs: (1) a scanner driver 5A; (2) a fax driver 5B; and (3) a printer driver 5C. The scanner driver 5A is a driver program for using the facsimile machine 7 as a scanner. The fax driver 5B is a driver program for using the facsimile machine 7 to either send data stored in the personal computer 1 to another facsimile machine via a telephone line, or to receive data via the telephone line from another facsimile machine to be input to the personal computer 1. The printer driver 5C is a driver program for using the facsimile machine 7 as a printer.

The monitor program 3, interposed between the I/O port 2 and the driver programs 5, manages the I/O port 2. That is, the monitor program 3 converts the format of the data sent to and received from the facsimile machine 7. The monitor program 3 is accessed by each of the three driver programs 5A, 5B and 5C.

The operation of the conventional image data reading system is shown in FIG. 4. In FIG. 4, dashed lines indicate the flow of commands or messages, and solid lines indicate the flow of data.

For the read operation, the facsimile machine 7 is used as a scanner for reading image data into the personal computer 1. It is assumed that the viewer program 6A triggers the reading of the image data. The viewer program 6A first issues a read command M1 to the scanner driver 5A. In response to the read command M1, the scanner driver 5A sends a read command M2 to the monitor program 3. In response to the read command M2, the monitor program 3 sends a read command M3 to the facsimile machine 7 via the I/O port 2.

Upon receipt of the read command M3, the facsimile machine 7 drives its scanner to read an image and generate corresponding image data M4. The facsimile machine 7 sends the image data M4 to the monitor program 3 one line at a time via the I/O port 2. The monitor program 3 converts the format of the image data M4 one line at a time and sends the converted image data M5 to the hard disk drive 4 for storage.

The line-by-line image data read operation is repeated until the image data M5 for a single page has been stored in the hard disk drive 4. When a single page has been stored in the hard disk drive 4, the monitor program 3 sends a message M6 to the scanner driver 5A. The message M6 notifies the scanner driver 5A that the image data M5 for a single page has been stored at a specific address in the hard disk drive 4. In response to the message M6, the scanner driver 5A sends a message M7 to the viewer program 6A that issued the read command M1. The message M7 notifies the viewer program 6A that a single page has been read and stored in the hard disk drive 4 and indicates the address at which the image data M5 for the single page is stored in the hard disk drive 4.

When the image data read operation has been completed for all pages, the facsimile machine 7 sends a read end message to the viewer program 6A through the I/O port 2, the monitor program 3 and the scanner driver 5A. In response to the read end message, the viewer program 6A accesses and reads the image data M5 from the hard disk drive 4, and displays a read-out image data M8 on the display screen.

The scanner driver 5A incorporates a time-out function that prevents the system from hanging up. Specifically, the monitor program 3 is expected to respond within a predetermined time period, for example, 30 seconds, after the scanner driver 5A has issued the read command M2, to instruct the monitor program 3 to read the image data. If the monitor program 3 fails to respond within the predetermined time period, the scanner driver 5A determines an error has occurred in the monitor program 3. Accordingly, the scanner driver 5A halts the read process and sends an error message to the viewer program 6A. In response to the error message, the viewer program 6A displays an error message on the display screen to alert the user.

Depending on the type of image data, the system can take a long time to read the image data or to convert the format of the image data once it has been read. The system can take a long time to perform the image data read operation if the system is also receiving or sending facsimile data. In such cases, the scanner driver 5A will unilaterally execute the time-out function even though the monitor program 3 is functioning normally. The reading of image data is then prematurely halted and may never be normally completed.

SUMMARY OF THE INVENTION

This invention provides an image data reading system in which a host system receives image data from a scanner without executing a time-out function, regardless of the length of time it takes for the scanner to transmit the data, and in which the host system receives the transmitted data as long as the data is being received normally.

In one preferred embodiment, the invention includes an image data reading system having a scanner that reads image data, and a host system connected to the scanner. The host system comprises a data receiver that receives image data read by the scanner and sent to the host, an operations monitor that monitors the receive operations of the data receiver, and a receive-in-progress signal generator that issues a receive-in-progress signal to the operations monitor while the data receiver is receiving data.

In this image data reading system, the image data read by the scanner is first transmitted to the host system. The transmitted data is received by the data receiver in the host system. While the data receiver is receiving data, the receive-in-progress signal generator issues a receive-in-progress signal to the operations monitor in the host system. In response to the receive-in-progress signal, the operations monitor determines that the data receiver is receiving data.

Because the operations monitor determines that the data receiver is currently receiving the image data, the image data reception will not be interrupted by a time-out function, regardless of the amount of time it takes to receive the image data.

In the preferred embodiment of the invention, the image data reading system further comprises a verification signal generator that generates a verification signal that verifies the operating status of the data receiver every time a predetermined period of time has elapsed. While the data receiver is receiving data, the receive-in-progress signal generator sends a receive-in-progress signal to the operations monitor after the receive-in-progress signal generator receives the verification signal from the verification signal generator.

In this preferred embodiment, the operation of the system is supplemented with the verification signal generator, which sends a verification signal to the receive-in-progress signal generator to verify the operating status of the data receiver every time a predetermined period of time has elapsed. If the data receiver is receiving data when the receive-in-progress signal generator receives the verification signal, the receive-in-progress signal generator sends a receive-in-progress signal to the operations monitor.

These and other features and advantages of this invention are described in or are apparent from the following detailed description of the preferred embodiments.

BRIEF DESCRIPTION OF THE DRAWINGS

A preferred embodiment of this invention will be described in detail with reference to the following figures, wherein.

DETAILED DESCRIPTION OF PREFERRED EMBODIMENTS

Figure 1:
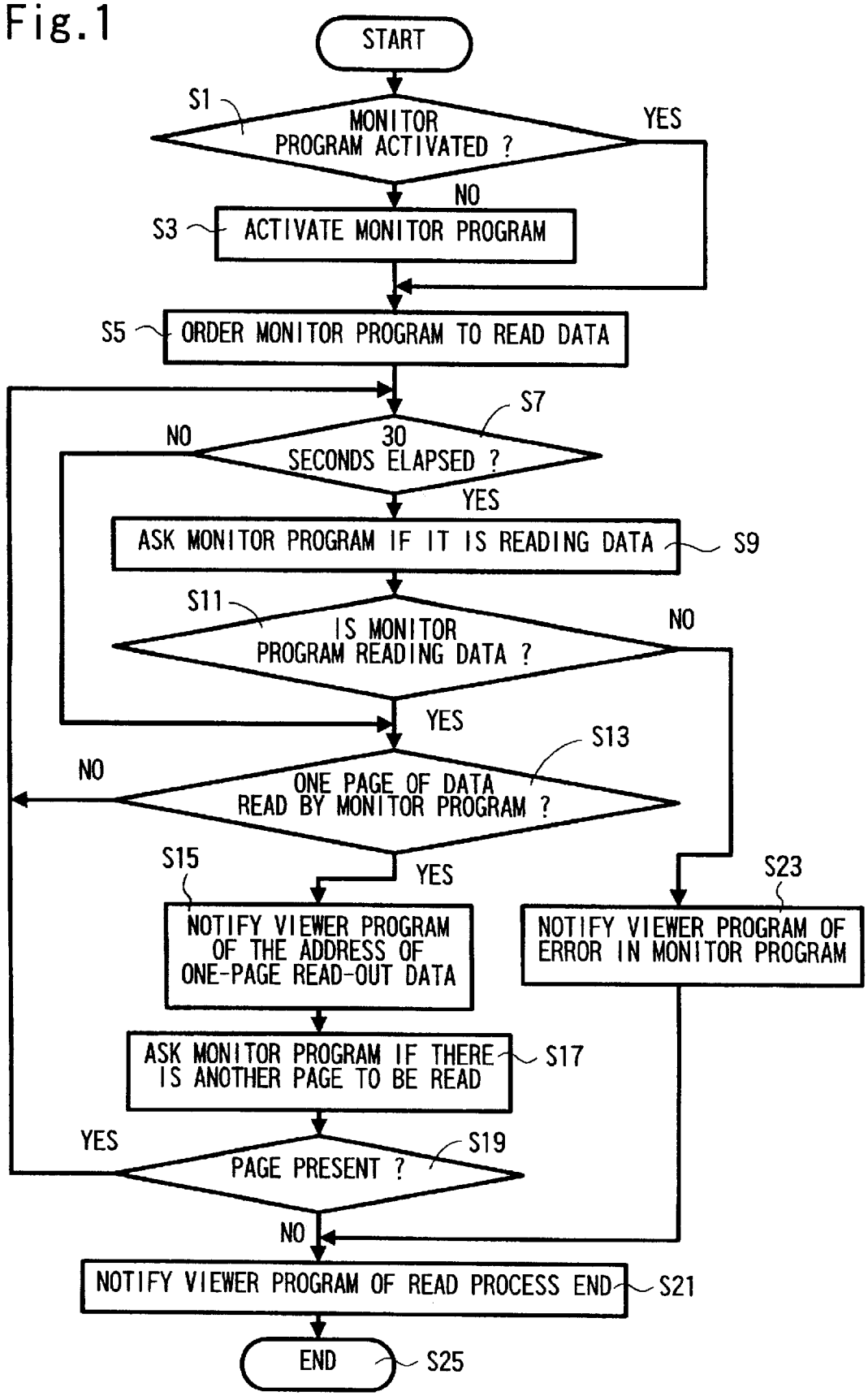
FIG. 1 is a flowchart of a preferred control routine for reading image data with a scanner driver according to this invention.

The image data reading system of this invention preferably comprises the personal computer 1 used as the host system and the facsimile machine 7 used as the scanner and connected to the host system 1. This configuration is similar to that of the conventional system shown in FIGS. 3 and 4. Thus, in describing the preferred embodiment of this invention, parts with substantially the same function as those already described or mentioned in connection with the system shown in FIGS. 3 and 4 will be designated by the same reference numerals, and their descriptions are omitted where repetitive.

FIG. 1 is a flowchart of a preferred control routine for reading image data with the scanner driver 5A. The control routine is preferably executed by one of the application programs 6, which is preferably the viewer program 6A triggering the reading of image data with the read command M1.

In step S1, the scanner driver checks if the monitor program 3 is active. If the monitor program 3 is not active, control continues to step S3, where the scanner driver 5A activates the monitor program 3. Control the continues to step S5. If the monitor program 3 is already active at step S1, control jumps directly to step S5.

At step S5, the scanner driver 5A directs the monitor program 3 to read the image data. The monitor program 3 reads the image data using the preferred control routine shown in FIG. 2. Although the control routines shown in FIGS. 1 and 2 for the scanner driver 5A and monitor program 3, respectively, are actually executed in parallel, the control routine of FIG. 1 for the scanner driver 5A is described first.

Next, at step S7, the scanner driver 5A determines if a predetermined time period, for example, 30 seconds, has elapsed. If the predetermined time period has not elapsed, control jumps to step S13. Otherwise, control continues to step S9.

If control continues to step S9 from step S7, an error may have occurred in the monitor program 3. Thus, in step S9, the scanner driver 5A sends an inquiry to the monitor program 3 that asks if the monitor program 3 is still reading image data. Next, at step S11, the scanner driver 5A evaluates the response of the monitor program 3 to the inquiry sent at step S9. If the monitor program 3 responds that it is not reading image data, the scanner driver 5A determines that an error has occurred. The error could be, for example, a paper jam in the facsimile machine 7, or the like. If an error has occurred control jumps to step S23. Otherwise, control continues to step S13.

In step S23, the scanner driver 5A notifies the viewer program 6A that triggered the read process of the error. Control then continues to step S21, where the scanner driver 5A notifies the viewer program 6A of the end of the image data reading process. The control routine then stops at step S25.

At step S13, the scanner driver 5A determines if a read end message for the current page has arrived from the monitor program 3. This corresponds to step S45 of FIG. 2. If the read end message is not detected, control returns to step S7. Steps S7 through S13 are repeated until the scanner driver 5A receives a read end message for the current page from the monitor program 3. When the read end message is detected at step S13, control continues to step S15.

At step S15, the scanner driver 5A notifies the viewer program 6A of the end of the single-page read operation and the address at which the single-page read-out data is stored in the hard disk drive 4. Control then continues to step S17, where the scanner driver 5A sends an inquiry to the monitor program 3 that asks if there is another page to be read. Next, at step S19, the scanner driver 5A evaluates the response of the monitor program 3 to the inquiry. If there is another page to be read, control returns to step S7, and steps S7 through S19 are repeated. If there are no more pages to be read, control continues to step S21.

Figure 2:
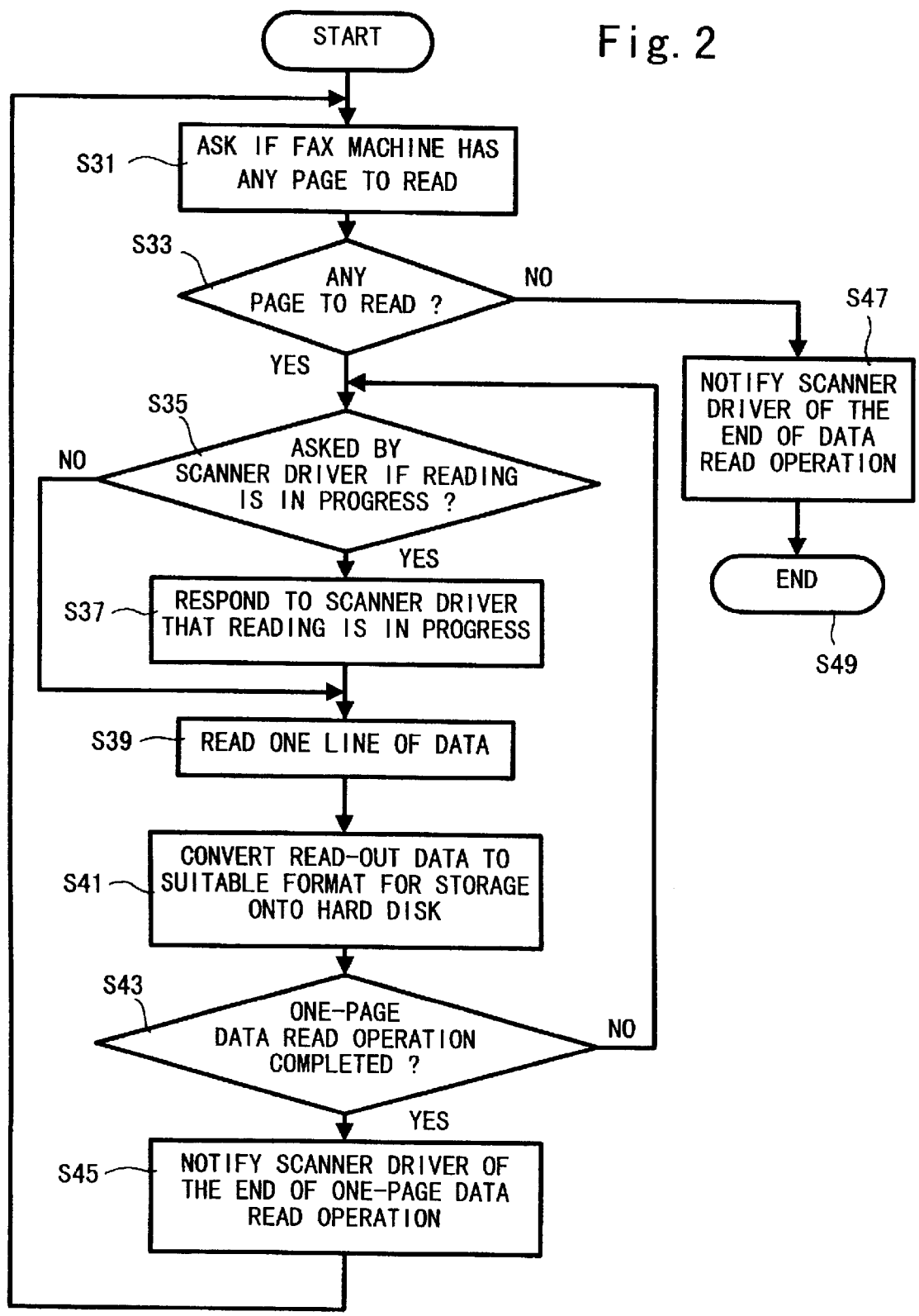
FIG. 2 is a flowchart of a preferred control routine for reading image data with a monitor program according to this invention.

FIG. 2 shows a preferred control routine used by the monitor program 3 to read the image data. The control routine shown in FIG. 2 is initiated by the scanner driver 5A at step S5 of the control routine shown in FIG. 1.

At step S31, the monitor program 3 sends an inquiry to the facsimile machine 7 asking if there is a page to be read. Next, at step S33, the control system evaluates the response of the facsimile machine 7 to the inquiry. If there is a page to be read, control continues to step S35. Otherwise, control jumps to step S47.

At step S47, the monitor program 3 notifies the scanner driver 5A of the end of the read operation. Control then continues to step S49, where the control routine stops.

At step S35, the monitor program 3 determines if the scanner driver 5A has inquired whether the monitor program 3 is reading data. This corresponds to step S9 shown in FIG. 13. If this inquiry has been made, control continues to step S37. Otherwise, control jumps directly to step S39.

At step S37, the monitor program 3 sends a read-in-progress message to the scanner driver 5A before the monitor program 3 reads single-line image data read by and sent from the facsimile machine 7. Control then continues to step S39.

In step S39, the monitor program 3 starts the single-line data read operation. Control then continues to step S41, where the monitor program 3 converts the single-line read-out image data to an appropriate format for storage onto the hard disk drive 4. Control then continues to step S43.

In step S43, the monitor program 3 determines if the one-page read operation has been completed. That is, the monitor program 3 determines if the entire page been read. If the one-page read operation has not been completed, control returns to step S35, and steps S35 through S43 are repeated. Otherwise, control continues to step S45, where the monitor program 3 notifies the scanner driver 5A of the end of the read operation. Control then returns to step S31, and steps S31 through S43 are repeated.

As described above, every time the predetermined time period elapses, the scanner driver 5A asks the monitor program 3 if data reading is still in progress. Depending on the monitor program's response to this inquiry, the scanner driver 5A will either perform error processing or take other appropriate steps. Accordingly, even if it takes a long period of time to read the image data, the read process is not forcibly interrupted through time-out processing, and the image data is still read normally.

The scanner and the host system of this invention are preferably implemented by the facsimile machine 7 and personal computer 1, respectively. The data receiver, operations monitor, and receive-in-progress signal generator are preferably implemented with the monitor program 3, the scanner driver 5A, and step S37 of the control routine of FIG. 2 for the monitor program 3, respectively. The verification signal generator is preferably implemented by steps S7 and S9 of the control routine shown in FIG. 1.

Figure 3:
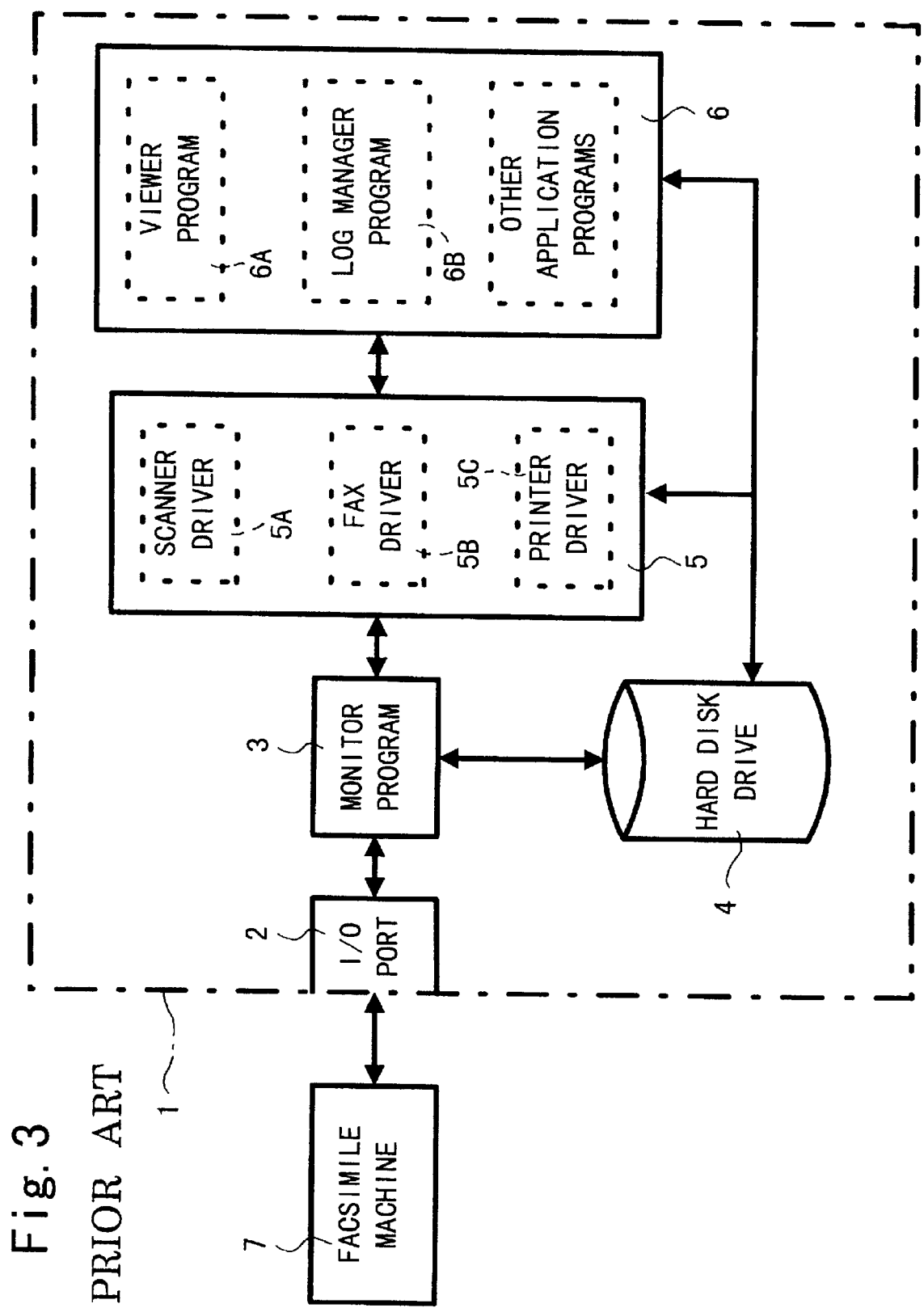
FIG. 3 is a block diagram of a conventional image data reading system.
Figure 4:
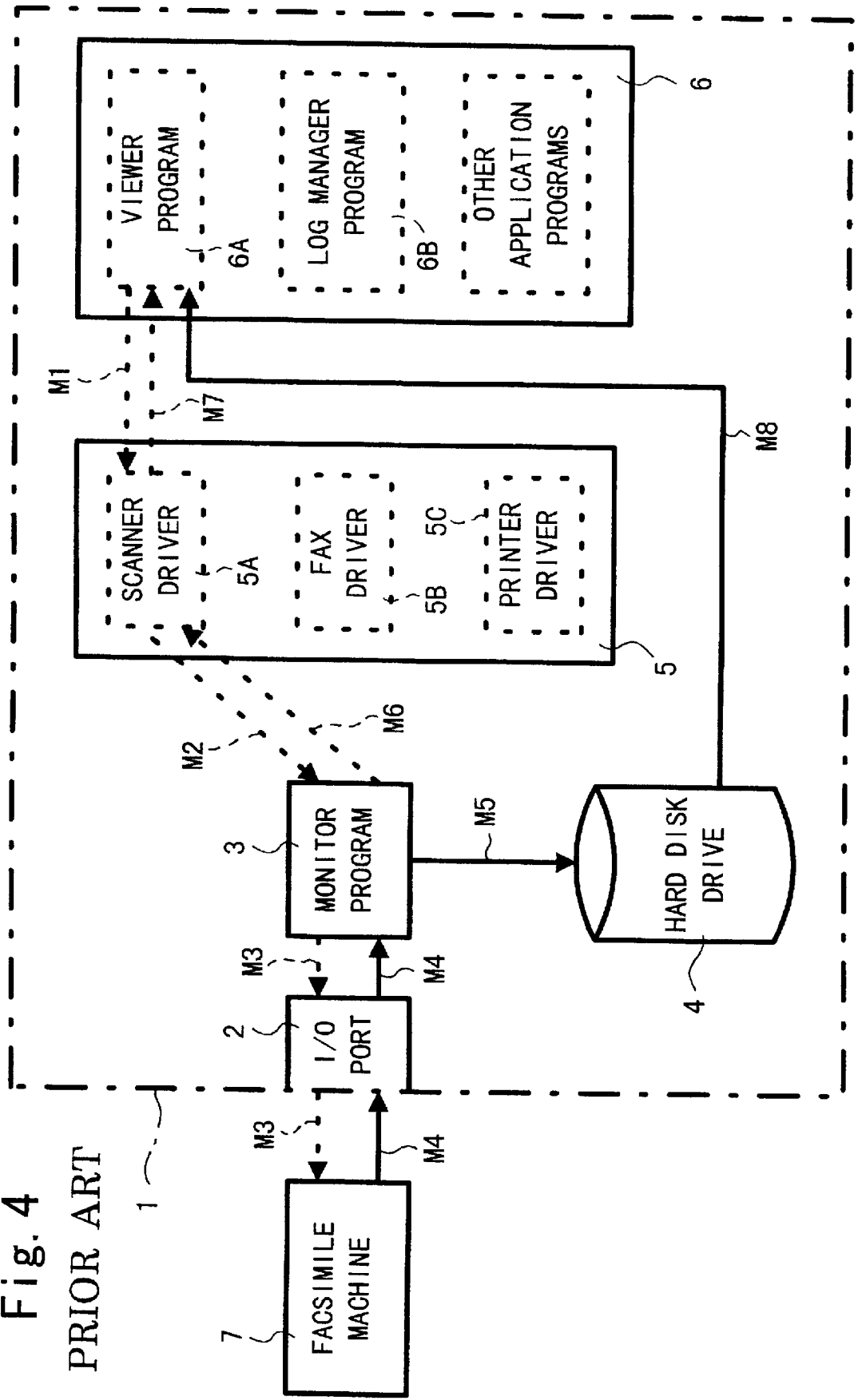
FIG. 4 is a block diagram showing how image data is read by the conventional image data reading system of FIG. 3.

As shown in FIGS. 3 and 4, the host 1 is preferably implemented on a programmed general purpose computer. However, the scanner driver 5A, the monitor program 3 and the control routines shown in FIGS. 1 and 2 can also be implemented on a special purpose computer, a programmed microprocessor or microcontroller and peripheral integrated circuit elements, an ASIC or other integrated circuit, a hardwired electronic or logic circuit such as a discrete element circuit, a programmable logic device such as a FPG, PLD, PLA or PAL, or the like. In general, any device on which a finite state machine capable of implementing the flowcharts shown in FIGS. 1 and 2 can be used to implement the scanner driver 5A, the monitor program 3 and the control routines shown in FIGS. 1 and 2.

While this invention has been described in conjunction with the specific embodiments outlined above, it is evident that many alternatives, modifications and variations will be apparent to those skilled in the art. For example, the control routine executed by scanner driver 5A may also be executed by the fax driver 5B or printer driver 5C in conjunction with the monitor program 3.

In the embodiment described above, the scanner driver 5A asks the monitor program 3 if data reading is in progress every 30 seconds, or some other appropriate predetermined time period. Depending on the response to this inquiry, the scanner driver 5A either performs error processing or carries out other appropriate steps. An alternative to this is a control routine in which the monitor program 3 periodically generates a read-in-progress signal, such as, for example, the receive-in-progress signal, so that the scanner driver 5A will recognize the data reception status without having to make periodic inquiries to the monitor program.

Accordingly, the preferred embodiments of the invention as set forth above are intended to be illustrative, not limiting. Various changes may be made without departing from the spirit and scope of the invention as defined in the following claims.

What is claimed is:

1. An image data reading system for reading image data, comprising:

a data receiver that receives the image data;

an operations monitor that monitors and controls the data receiver;

a receive-in-progress signal generator that periodically generates and sends a receive-in-progress signal to the operations monitor while the data receiver receives the image data; and a verification signal generator that periodically generates and sends a verification signal to the receive-in-progress signal generator while the data receiver receives the image data;

wherein the receive-in-progress signal generator generates and sends the receive-in-progress signal to the operations monitor in response to receiving the verification signal from the verification signal generator.

2. The image data reading system of claim 1, wherein the verification signal generator generates and sends the verification signal to the receive-in-progress signal generator each time a predetermined time period elapses and while the data receiver receives the image data.

3. The image data reading system of claim 2, wherein the operations monitor determines that a read error has occurred when a receive-in-progress signal is not received after the predetermined time period elapses and the data receiver has not received an end of the image data.

4. The image data reading system of claim 2, wherein the predetermined time period is 30 seconds.

5. An image data reading system, comprising:

a scanner that scans an image and generates corresponding image data; and a host system that is connected to the scanner and that receives the image data, the host system comprising:

a data receiver that receives the image data, an operations monitor that monitors and controls the data receiver, and a receive-in-progress signal generator that periodically generates and sends a receive-in-progress signal to the operations monitor while the data receiver receives the image data.

6. The image data reading system of claim 5, wherein the scanner comprises a facsimile machine and the host system comprises a personal computer.

7. The image data reading system of claim 6, further comprising a verification signal generator that periodically generates and sends a verification signal to the receive-in-progress signal generator while the data receiver receives the image data;

wherein the receive-in-progress signal generator generates and sends the receive-in-progress signal to the operations monitor in response to receiving the verification signal from the verification signal generator.

8. The image data reading system of claim 7, wherein he verification signal generator generates and sends the verification signal to the receive-in-progress signal generator each time a predetermined time period elapses and while the data receiver receives the image data.

9. The image data reading system of claim 8, wherein the operations monitor determines that a read error has occurred when the receive-in-progress signal is not received after the predetermined time period elapses and the data receiver has not received an end of the image data.

10. The image data reading system of claim 8, wherein the predetermined time period is 30 seconds.

11. An image data reading system for reading image data, comprising:

data receiving means for receiving the image data;

operations monitoring means for monitoring and controlling the data receiving means;

receive-in-progress signal generating means for periodically generating and sending a receive-in-progress signal to the operations monitoring means while the data receiving means receives the image data; and verification signal generating means for periodically generating and sending a verification signal to the receive-in-progress signal generating means while the data receiving means receives the image data;

wherein the receive-in-progress signal generating means generates and sends the receive-in-progress signal to the operations monitoring means in response to receiving the verification signal from the verification signal generating means.

12. The image data reading system of claim 11, wherein the verification signal generating means generates and sends the verification signal to the receive-in-progress signal generating means each time a predetermined time period elapses and while the data receiving means receives the image data.

13. The image data reading system of claim 12, wherein the operations monitoring means determines that a read error has occurred when a receive-in-progress signal is not received after the predetermined time period elapses and the data receiving means has not received an end of the image data.

14. The image data reading system of claim 12, wherein the predetermined time period is 30 seconds.

15. A method of reading image data, comprising:

receiving the image data read by a scanner;

monitoring the data reception;

periodically generating a receive-in-progress signal while image data is being received; and periodically generating a verification signal while the image data is being received, wherein the receive-in-progress signal is generated in response to the verification signal.

16. The method of claim 15, wherein the verification signal is generated each time a predetermined time period elapses and while image data is being read.

17. The method of claim 16, further comprising determining that a read error has occurred when a receive-in-progress signal is not detected after the predetermined time period elapses and an end of the image data has not been read.

18. The method of claim 16, wherein the predetermined time period is 30 seconds.

* * * * *